United States Patent
Li et al.

(10) Patent No.: US 12,188,829 B2
(45) Date of Patent: Jan. 7, 2025

(54) SENSOR, METHOD FOR PRODUCTING SAME, AND TEST METHOD AND DEVICE THEREOF

(71) Applicant: BOE Technology Group Co., Ltd., Beijing (CN)

(72) Inventors: Fan Li, Beijing (CN); Junrui Zhang, Beijing (CN); Ronghua Lan, Beijing (CN); Zhidong Wang, Beijing (CN); Lijia Zhou, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 719 days.

(21) Appl. No.: 17/407,998

(22) Filed: Aug. 20, 2021

(65) Prior Publication Data
US 2022/0082444 A1  Mar. 17, 2022

(30) Foreign Application Priority Data
Sep. 11, 2020  (CN) .......................... 202010955216.9

(51) Int. Cl.
*G01J 5/00* (2022.01)
*G01J 5/02* (2022.01)
(Continued)

(52) U.S. Cl.
CPC . *G01J 5/12* (2013.01); *G01J 5/00* (2013.01); *G01J 5/02* (2013.01); *G01J 5/024* (2013.01);
(Continued)

(58) Field of Classification Search
CPC ........ G01J 5/12; G01J 5/00; G01J 5/02; G01J 5/024; G01J 5/10; G01J 2005/123;
(Continued)

(56) References Cited

U.S. PATENT DOCUMENTS

| | | | |
|---|---|---|---|
| 2004/0169144 A1* | 9/2004 | Shibayama | G01J 5/12 250/338.1 |
| 2008/0165620 A1* | 7/2008 | Sugiura | G01S 17/89 367/99 |

(Continued)

FOREIGN PATENT DOCUMENTS

| | | | | |
|---|---|---|---|---|
| CN | 108231748 A | * | 6/2018 | ....... H01L 21/76895 |
| CN | 105424199 B | * | 10/2018 | ............... B81B 7/02 |

OTHER PUBLICATIONS

Translation of CN-105424199-B (Year: 2018).*
Translation of CN-108231748-A (Year: 2018).*

*Primary Examiner* — David P Porta
*Assistant Examiner* — Mamadou Faye
(74) *Attorney, Agent, or Firm* — IPro, PLLC

(57) ABSTRACT

A sensor includes: a substrate and at least one infrared temperature measurement unit disposed on the substrate. An infrared temperature measurement sub-unit includes: a first support portion, at least one second support portion, a thermocouple, and an infrared absorption portion. The thermocouple includes a first electrode and a second electrode, each of which includes a first end and a second end; the first ends of the first electrode and the second electrode are connected and disposed on the first support portion; the infrared absorption portion is disposed on the first support portion and covers the first ends of the first electrode and the second electrode; the second ends of the first electrode and the second electrode are not connected and disposed on the second support portion; and in the infrared temperature measurement unit, a cavity structure is included between at least the adjacent first and second support portions.

19 Claims, 12 Drawing Sheets

(51) Int. Cl.
*G01J 5/10* (2006.01)
*G01J 5/12* (2006.01)
*G01K 7/02* (2021.01)

(52) U.S. Cl.
CPC .................. *G01J 5/10* (2013.01); *G01K 7/02* (2013.01); *G01J 2005/123* (2013.01)

(58) Field of Classification Search
CPC .. G01J 5/023; G01J 5/16; G01J 5/0205; G01J 5/20; G01J 5/22; G01J 2005/103; G01J 2005/106; G01J 2005/204; G01J 2005/206; G01J 5/48; G01K 7/02
See application file for complete search history.

(56) References Cited

U.S. PATENT DOCUMENTS

| | | | |
|---|---|---|---|
| 2011/0110394 A1* | 5/2011 | Kaess | G01N 21/3504 374/121 |
| 2014/0036953 A1* | 2/2014 | Kimura | G01J 5/16 438/54 |
| 2014/0254092 A1* | 9/2014 | Im | H01L 25/18 361/688 |
| 2017/0370777 A1* | 12/2017 | Tanaka | G01J 5/48 |

\* cited by examiner

SENSOR, METHOD FOR PRODUCTING SAME, AND TEST METHOD AND DEVICE THEREOF

The disclosure claims the priority of a Chinese patent application filed in the China National Intellectual Property Administration on Sep. 11, 2020 with an application number of 202010955216.9 and a title of "SENSOR, METHOD FOR PRODUCING SAME, AND TEST METHOD AND DEVICE THEREOF", the entire contents of which are hereby incorporated by reference.

TECHNICAL FIELD

The present disclosure relates to the technical field of sensors, and provides a sensor, a method for producing the same, and a test method and device thereof.

BACKGROUND

With advantages such as simple structure, ease in production, wide measurement range, and high precision, infrared thermopile temperature sensors have been widely applied to the field of temperature measurement.

SUMMARY

Embodiments of the present disclosure provide a sensor, a method for producing the same, and a test method and device thereof.

The embodiments of the present disclosure employ the following technical solutions.

In one aspect, a sensor is provided. The sensor includes: a substrate and at least one infrared temperature measurement unit disposed on the substrate, wherein the infrared temperature measurement unit includes at least one infrared temperature measurement sub-unit;

the at least one infrared temperature measurement sub-unit includes: a first support portion, at least one second support portion, a thermocouple, and an infrared absorption portion, wherein the thermocouple includes a first electrode and a second electrode, each of which includes a first end and a second end; the first end of the first electrode and the first end of the second electrode are connected and disposed on the first support portion; the infrared absorption portion is disposed on the first support portion and covers the first end of the first electrode and the first end of the second electrode; the second end of the first electrode and the second end of the second electrode are not connected and disposed on the second support portion; and in the sensor, a cavity structure is included between at least the adjacent first support portion and the second support portion.

Optionally, in the infrared temperature measurement sub-unit, the first support portion comprises a first sacrifice sub-portion and a first support sub-portion, and the second support portion comprises a second sacrifice sub-portion and a second support sub-portion; the first sacrifice sub-portion and the second sacrifice sub-portion are arranged on the same layer, and the first support sub-portion and the second support sub-portion are arranged on the same layer;

wherein the first support sub-portion comprises a coverage sub-portion and an extension sub-portion surrounding the coverage sub-portion, and the coverage sub-portion covers the first sacrifice sub-portion; the first ends of the first electrode and the second electrode of the thermocouple are both disposed on the extension sub-portion; the infrared absorption portion is deposed on the extension sub-portion and covers the first end of the first electrode and the first end of the second electrode; the second ends of the first electrode and the second electrode are disposed on the second support sub-portion; the second support sub-portion covers the second sacrifice sub-portion; and in the infrared temperature measurement unit, a cavity structure is comprised between at least the adjacent first sacrifice sub-portion and the second sacrifice sub-portion.

Optionally, the infrared temperature measurement unit comprises a plurality of the infrared temperature measurement sub-units; and in the infrared temperature measurement unit, the cavity structures are comprised between any adjacent first sacrifice sub-portions, between any adjacent second sacrifice sub-portions, and between any the adjacent first sacrifice sub-portion and the second sacrifice sub-portion.

Optionally, the infrared temperature measurement sub-unit further comprises: a first insulating portion and at least one second insulating portion; the first insulating portion and the second insulating portion are arranged on the same layer; the first insulating portion covers the first support sub-portion and disposed between the first support sub-portion and the thermocouple; and the second insulating portion covers the second support sub-portion and disposed between the second support sub-portion and the thermocouple.

Optionally, materials for the first sacrifice sub-portion and the second sacrifice sub-portion comprise an organic material; materials for the first support sub-portion and the second support sub-portion comprise metal; and a material for the thermocouple comprises metal.

Optionally, the thermocouples of the plurality of infrared temperature measurement sub-units comprised by the infrared temperature measurement unit are connected in series.

Optionally, the number of the second insulating portion is the same as the number of the second support sub-portion.

Optionally, further comprising at least one visible-light sensing unit disposed between the substrate and the at least one infrared temperature measurement sub-unit, wherein the visible-light sensing unit comprises: an interdigital electrode and a visible-light absorption portion covering the interdigital electrode.

Optionally, an orthographic projection of the visible-light sensing unit on the substrate is at least partly disposed within an orthographic projection of the cavity structure of the infrared temperature measurement sub-unit on the substrate.

Optionally, the interdigital electrode comprises a first comb electrode and a second comb electrode; the first comb electrode comprises: a plurality of first comb-teeth electrodes arranged in parallel and a first comb-shank electrode connecting the plurality of first comb-teeth electrodes; the second comb electrode comprises s: a plurality of second comb-teeth electrodes arranged in parallel and a second comb-shank electrode connecting the plurality of second comb-teeth electrodes; and the plurality of first comb-teeth electrodes and the plurality of second comb-teeth electrodes are mutually crossed in arrangement.

Optionally, the plurality of infrared temperature measurement units is arranged in an array.

Optionally, a material for the substrate comprises glass or polyimide.

In another aspect, a test device is provided. The test device includes the sensor defined above.

In yet another aspect, a method for producing a sensor is provided. The method includes:

providing a substrate; and forming at least one infrared temperature measurement sub-unit on the substrate;

wherein forming the at least one infrared temperature measurement sub-unit on the substrate comprises:

forming at least one first support portion, at least one second support portion, at least one thermocouple, and at least one infrared absorption portion on the substrate.

Optionally, comprising: forming a sacrifice film on the substrate by the spinning method, wherein a material for the sacrifice film is polyimide.

Optionally, the method further comprises: forming a cavity structure by performing dry-etching over-etching on the sacrifice film.

Optionally, the sensor further comprises at least one visible-light sensing unit; and after providing the substrate and before forming the at least one infrared temperature measurement unit on the substrate, the method further comprises:

forming at least one visible-light sensing unit on the substrate.

In yet another aspect, a test method of the sensor as described above is provided. The method comprises:

disposing the sensor nearby an object to be tested, so that the sensor is capable to receive infrared light emitted by the object to be tested;

detecting an electromotive potential output by a thermocouple in the sensor; and calculating temperature of the object to be tested according to the electromotive potential.

Optionally, the thermocouples are a plurality of thermocouples connected in series, and in the step of calculating temperature of the object to be tested according to the electromotive potential, the electromotive potential is the total electromotive potential of the plurality of thermocouples connected in series.

Optionally, the sensor further comprises at least one visible-light sensing unit, the method further comprises:

disposing the sensor in an environment to be tested, so that the sensor is capable to receive visible light in the environment to be tested;

detecting a current output by an interdigital electrode in the sensor; and calculating light intensity of the visible light in the environment to be tested based on the current.

The above description is only an overview of the technical solution of the present disclosure, which can be implemented according to the contents of the specification in order to understand the technical means of the present disclosure more clearly, and in order to make the above and other objects, features and advantages of the present disclosure more obvious and understandable, the detailed description of the present disclosure will be given below.

BRIEF DESCRIPTION OF THE DRAWINGS

To describe the technical solutions in the embodiments of the present disclosure or in the prior art more clearly, the following briefly introduces the accompanying drawings to be used in the descriptions of the embodiments or the prior art. Obviously, the accompanying drawings in the following description show merely some embodiments of the present disclosure, and a person of ordinary skills in the art may still derive other drawings from these accompanying drawings without creative efforts.

DETAILED DESCRIPTION

Figure 1A:
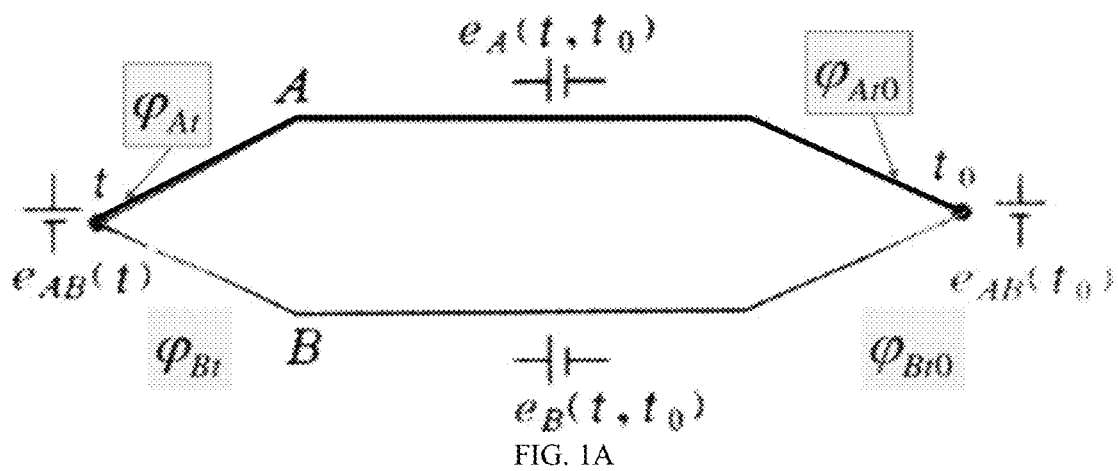
FIG. 1A is a schematic diagram of a Seebeck effect.

The technical solutions in the embodiments of the present disclosure will be described clearly and completely below in conjunction with the accompanying drawings in the embodiments of the present disclosure. Obviously, the embodiments described are merely some rather than all of the embodiments of the present disclosure. Based on the embodiments of the present disclosure, every other embodiment obtained by a person of ordinary skills in the art without making creative efforts shall fall within the protection scope of the present disclosure.

In the embodiments of the present disclosure, words such as "first" and "second" are used to distinguish identical or similar items with substantially the same functions and effects, merely for the purpose of clearly describing the technical solutions of the embodiments of the present disclosure. These should not to be construed as indicating or implying relative importance or implicitly specifying the number of technical features indicated.

In the embodiments of the present disclosure, unless otherwise clearly specified, "a plurality of" means two or more, and "at least one" means one or more.

In the embodiments of the present disclosure, terms such as "up" and "down" indicate directions or positional relations based on the directions or position relations shown in the accompanying drawings only for the purposes of describing the present disclosure and simplifying the description, instead of indicating or implying that a referred device or element must have a specific direction or must be constructed and operated in a specific direction. Therefore, these terms should not be construed as limiting the present disclosure.

This embodiment of the present disclosure provides a sensor. The sensor includes: a substrate and at least one infrared temperature measurement unit disposed on the substrate; and the infrared temperature measurement unit includes at least one infrared temperature measurement sub-unit.

The infrared temperature measurement sub-unit includes: a first support portion, at least one second support portion, a thermocouple, and an infrared absorption portion.

Here, the thermocouple includes a first electrode and a second electrode, each of which includes a first end and a second end; the first end of the first electrode and the first end of the second electrode are connected and disposed on the first support portion; the infrared absorption portion is disposed on the first support portion and covers the first end of the first electrode and the first end of the second electrode; and the second end of the first electrode and the second end of the second electrode are not connected and disposed on the second support portion.

In the infrared temperature measurement unit, a cavity structure is at least included between the adjacent first and second support portions.

When there is a plurality of infrared temperature measurement units, the manner of arranging the plurality of infrared temperature measurement units is not limited and can be specifically determined according to actual needs. For example, the plurality of infrared temperature measurement units may be arranged in an array.

Figure 1B:
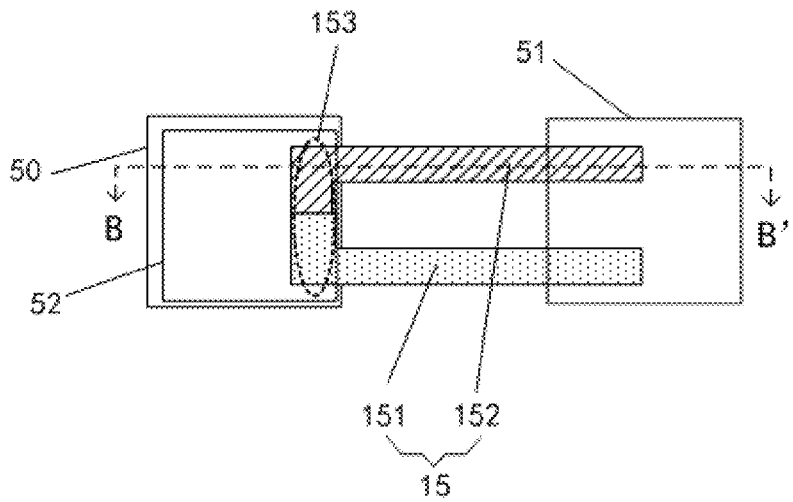
FIG. 1B is a schematic structural diagram of an infrared temperature measurement sub-unit according to an embodiment of the present disclosure.
Figure 1C:
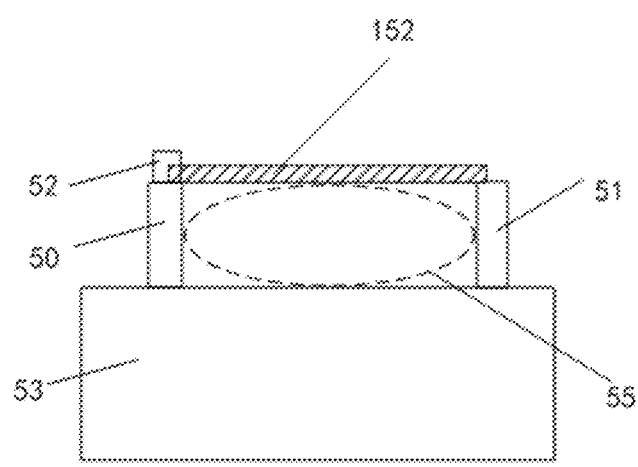
FIG. 1C is a sectional view taken along a direction BB' in FIG. 1B.
Figure 5:
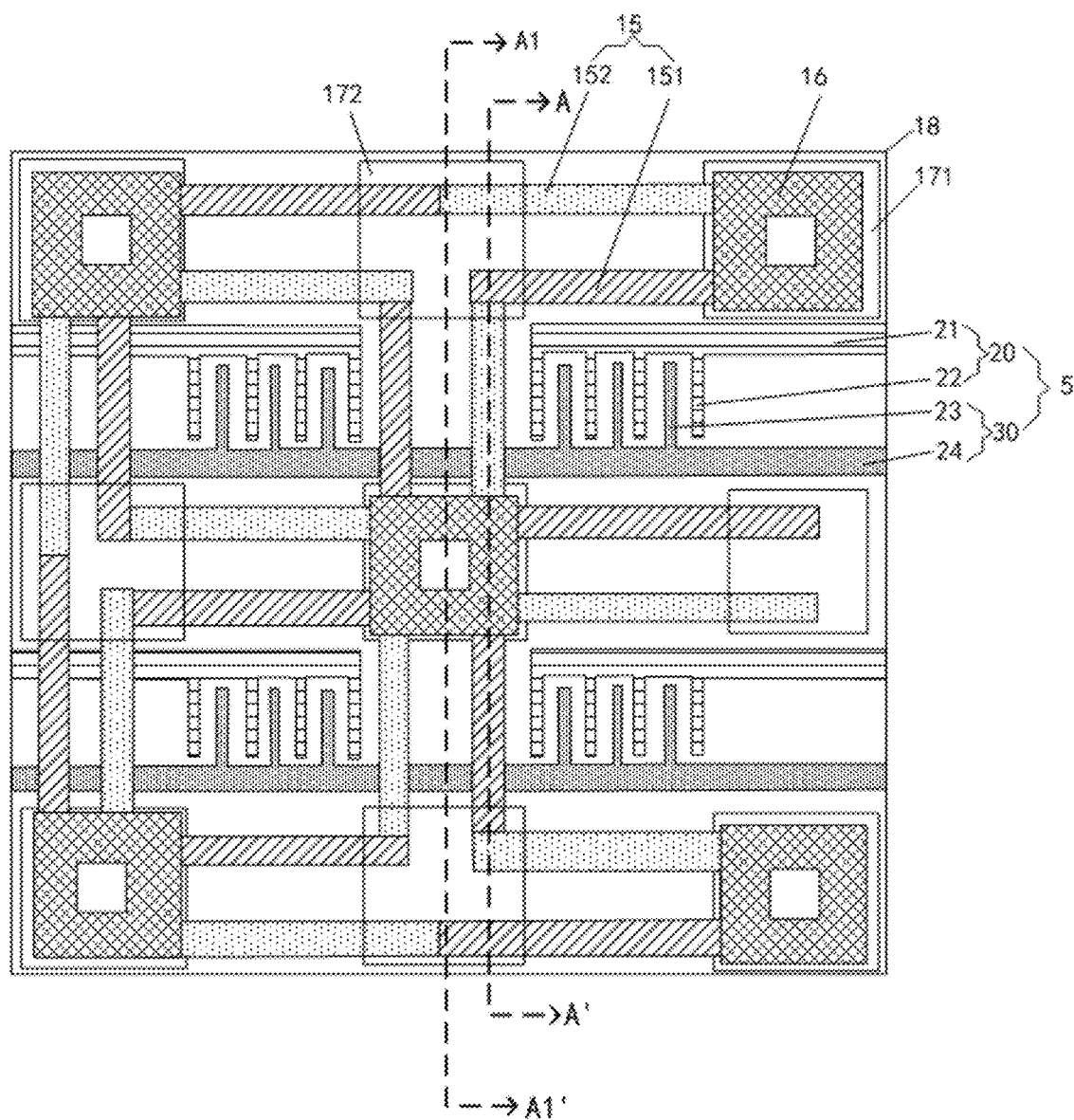

Here, the number of the infrared temperature measurement sub-units included in the infrared temperature measurement unit is not limited. The infrared temperature measurement unit may be as shown in FIG. 1b, and only includes one infrared temperature measurement sub-unit. The infrared temperature measurement sub-unit may only include a first support portion 50, a second support portion 51, a thermocouple 15, and an infrared absorption portion 52, where the thermocouple 15 includes a first electrode 151 and a second electrode 152, each of which includes a first end and a second end; the first end of the first electrode and the first end of the second electrode are connected (i.e., at a junction 153 for the first electrode and the second electrode) and disposed on the first support portion 50; the infrared absorption portion 52 is disposed on the first support portion 50 and covers the first end of the first electrode and the first end of the second electrode (i.e., at the junction 153 between the first electrode and the second electrode); and the second end of the first electrode and the second end of the second electrode are not connected and disposed on the second support portion 51. Referring to the depiction in FIG. 1c, the infrared temperature measurement sub-unit includes a substrate 53, and a cavity structure 55 is included between the adjacent first and second support portions 50 and 51. Or, two or more infrared temperature measurement sub-units may be also included. For example, as shown in FIG. 5, 10 infrared temperature measurement sub-units are included.

Here, the specific structures of the first and second support portions in the infrared temperature measurement unit are not limited either.

A material for the substrate may be a non-silicon rigid material, for example, glass, where the sensor may be a rigid device that has no bendable property. Or, the material for the substrate may also be a non-silicon flexible material, for example, polyimide (Pl), where the sensor may be a flexible device that has a bendable property.

A material for the infrared absorption portion may include a traditional compound material, for example, lead sulfide (PbS), cadmium sulfide (CdS), lead selenide (PbSe), indium antimonide (InSb), indium arsenide (InAs), indium gallium arsenide (InGaAs), tin lead telluride (PbSnTe), cadmium mercury telluride (HgCdTe), indium telluride (InTe), magnesium oxide (MgO), etc. Such a compound material has a wide range of absorption wavelength, and involves near-, middle- and far-infrared wave bands. Or the material for the infrared absorption portion may also include a novel compound material, for example, zinc mercury telluride (HgZnTe), etc. Such a compound material has a wide range of absorption wavelength, with greater chemical stability. Or, the material for the infrared absorption portion may also include a III-V superlattice quantum-well compound, for example, an indium arsenide/gallium antimonide (InAs/GaSb) strained-layer superlattice material, a gallium arsenide/aluminum gallium arsenide (GaAs/AlGaAs) quantum-well material, etc. Such a compound material mainly absorbs a far-infrared wave band of 8 μm-14 μm. Or, the material for the infrared absorption portion may also include a silicon germanium (SiGe) material, for example, a silicon/silicon germanium (Si/SiGe) heterojunction material. Such a compound material mainly absorbs an infrared wave band of 3 μm-30 μm.

Based on a Seebeck effect, the aforesaid thermocouple may covert temperature signals into thermoelectromotive potential signals to complete temperature measurement. Referring to the depiction in FIG. 1a, two different conductors A and B form a loop, and both ends of the conductors A and B are connected respectively to form two junctions. If the two junctions are different in temperature, with the temperature of the left junction as t0 and the temperature of the right junction as t, then a current passes the closed loop to generate a thermoelectromotive potential, which is the Seebeck effect. Here, the junction with high temperature is called a hot end, and the junction with low temperature is called a cold end. The thermoelectromotive potential consists of two parts of electromotive potential: one part is contact electromotive potentials $e_{AB}(t)$ and $e_{AB}(t0)$ of the two conductors, and the other part is temperature-difference electromotive potentials $e_A(t, t0)$ and $e_B(t, t0)$ of single conductors. The potentials at both ends of the conductor A are $\varphi_{At}$ and $\varphi_{At0}$ respectively, and the potentials at both ends of the conductor B are $\varphi_{Bt}$ and $\varphi_{Bt0}$ respectively. In addition, when a third type of metal conductor is connected to the loop of the thermocouple, the thermoelectromotive potential generated by the thermocouple remains the same as long as two junctions of the third conductor are same in temperature. That is, the thermoelectromotive potential generated by the thermocouple is free from the influence of the connection of the third type of metal conductor to the loop. Therefore, when the thermocouple measures the temperature, a measuring meter may be connected, and the temperature of an object to be measured may be acquired after the thermoelectromotive potential is measured.

When the sensor is used for detecting the temperature, the infrared absorption portion absorbs infrared rays and then generates heat to raise the temperature of the junction covered thereby, allowing the thermocouple to generate a thermoelectromotive potential. By measuring the magnitude of the thermoelectromotive potential, the temperature can be measured, thereby realizing infrared temperature measurement.

The thermocouple includes the first electrode and the second electrode, both of which are connected and are made from different materials. The materials or the first and second electrodes may be different metal, or different metal alloys, or may include metal and metal alloy. The specific materials for the first and second electrodes may be as shown in Table 1.

TABLE 1

| | First electrode (also as an anode) | Second electrode (also as a cathode) | Detected temperature range (° C.) |
|---|---|---|---|
| 1 | Platinum-rhodium alloy (rhodium content: 10%) | Pure platinum | 0-1400 |
| 2 | Platinum-rhodium alloy (rhodium content: 13%) | Pure platinum | 0-1400 |
| 3 | Platinum-rhodium alloy (rhodium content: 30%) | Platinum-rhodium alloy (rhodium content: 6%) | 0-1400 |

TABLE 1-continued

| | First electrode (also as an anode) | Second electrode (also as a cathode) | Detected temperature range (° C.) |
|---|---|---|---|
| 4 | Nickel-chromium | Nickel-silicon | −200-1000 |
| 5 | Pure copper | Copper-nickel | −200-300 |
| 6 | Iron | Copper-nickel | −200-600 |
| 7 | Nickel-chromium-silicon | Nickel-silicon | −200-1200 |
| 8 | Nickel-chromium | Copper-nickel | −200-700 |

The infrared absorption portion is disposed on the first support portion, covers the first end of the first electrode and the first end of the second electrode, and may be shaped as a ring, a strip, etc. In addition, the infrared absorption portion may only cover the first end of the first electrode and the first end of the second electrode, or may also cover an area of the support portion on which the first end of the first electrode and the first end of the second electrode are not disposed, which is not limited here.

In the thermocouple, the first end of the first electrode is connected to the first end of the second electrode, where a connected portion may be called a junction of the first and second electrodes. The second end of the first electrode is not connected to the second end of the second electrode, and is disposed on the second support portion, where the second end of the first electrode and the second end of the second electrode may be simultaneously disposed on the same second support portion, or also disposed on different second support portions, which is not limited here. In consideration of space saving, the former is preferred.

In the infrared temperature measurement unit, the cavity structure is at least included between the adjacent first and second support portions. It should be noted that in the case that the infrared temperature measurement unit only includes one infrared temperature measurement sub-unit, the cavity structure here may be included between the adjacent first and second support portions. In the case that the infrared temperature measurement unit includes a plurality of infrared temperature measurement sub-units, the cavity structure here may be included between any adjacent first support portions, any adjacent second support portions, and any adjacent first and second support portions, respectively. This is not specifically limited here.

The cavity structure of the sensor is at least disposed between the adjacent first and second support portions. Compared with a cavity structure produced from a silicon substrate, this can effectively reduce the cost, with simple production process and low technical difficulty.

Figure 6:
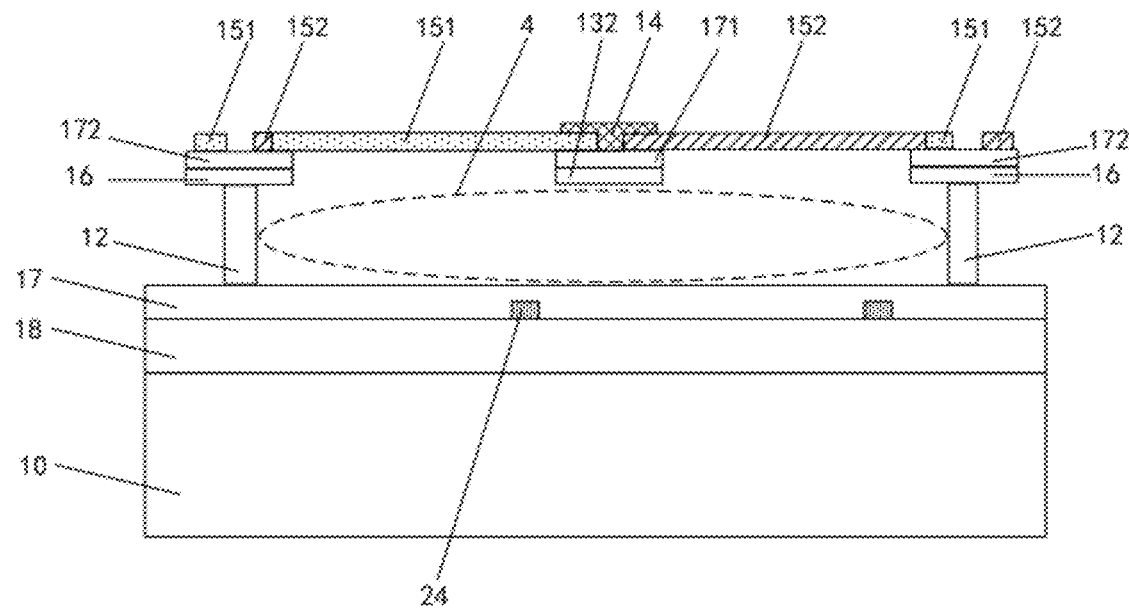
FIG. 6 is a sectional view taken along a direction AA' in FIG. 5.
Figure 7:
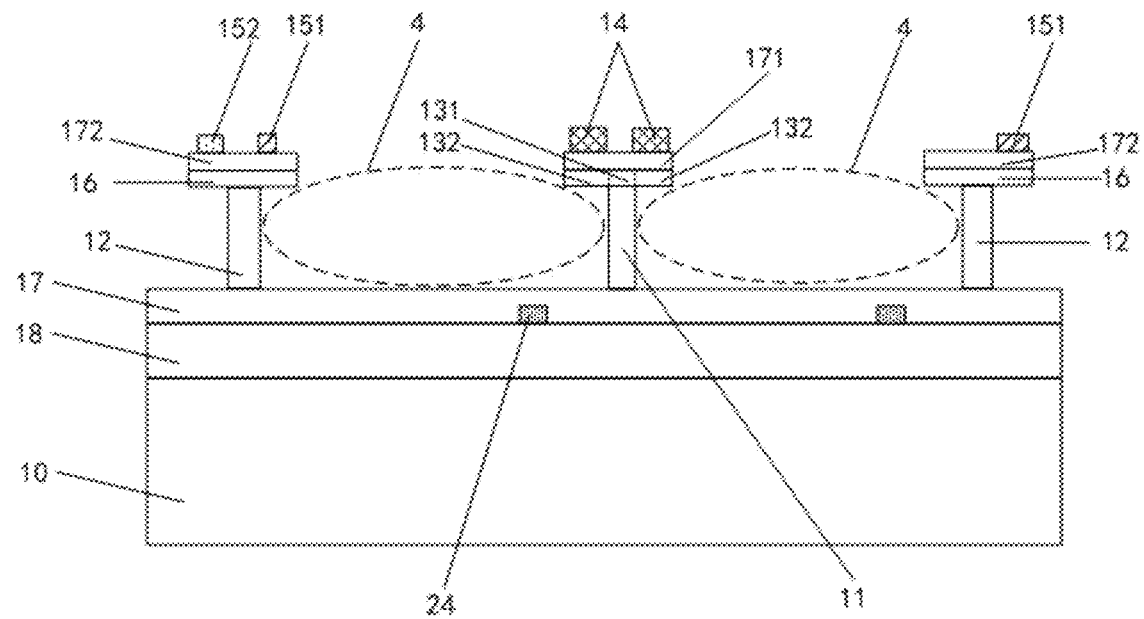
FIG. 7 is a sectional view taken along a direction A1A1' in FIG. 5.

Optionally, with reference to FIGS. 5 to 7, in the infrared temperature measurement unit, the first support portion includes a first sacrifice sub-portion 11 and a first support sub-portion 13, and the second support portion includes a second sacrifice sub-portion 12 and a second support sub-portion 14; the first sacrifice sub-portion and the second sacrifice sub-portion are arranged on the same layer, and the first support sub-portion and the second support sub-portion are arranged on the same layer.

Figure 4:
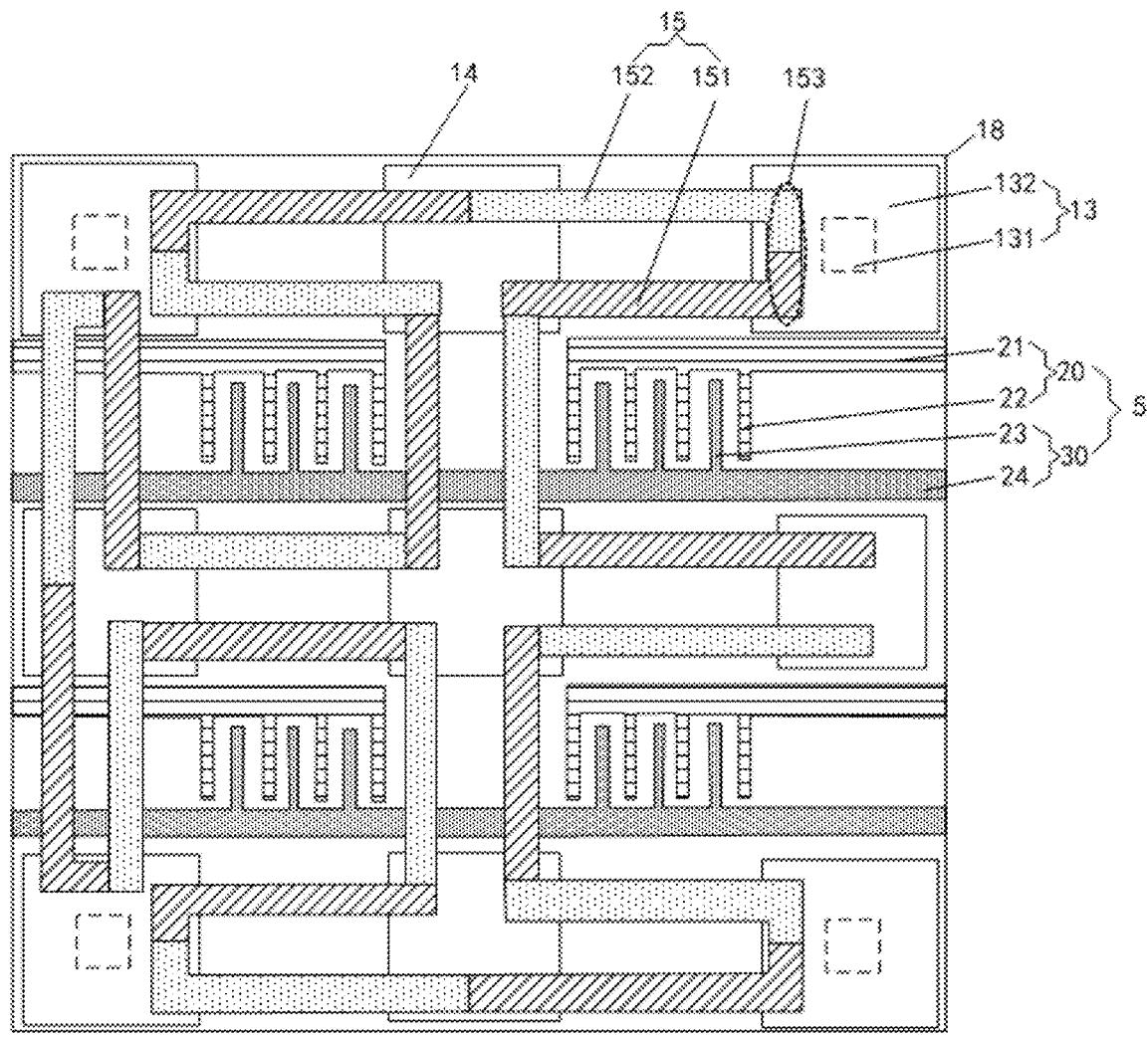

Here, with reference to the depictions in FIG. 4, FIG. 5 and FIG. 7, the first support sub-portion 13 includes a coverage sub-portion 131 and an extension sub-portion 132 surrounding the coverage sub-portion 131, and the coverage sub-portion 131 covers a first sacrifice sub-portion 11; the first ends (which are represented as a junction 153 of the first and second electrodes in the drawings) of both the first electrode 151 and the second electrode 152 of the thermocouple 15 are disposed on the extension sub-portion 132; the infrared absorption portion 16 is disposed on the extension sub-portion 132 and covers the first ends (i.e., the junction 153 in FIG. 4) of the first and second electrodes; the second end of the first electrode and the second end of the second electrode are disposed on the second support sub-portion; and the second support sub-portion 14 covers the second sacrifice sub-portion 12.

In the infrared temperature measurement unit, the cavity structure is at least included between the adjacent first and second sacrifice sub-portions.

Materials for the first and second sacrifice sub-portions may include an organic material, for example, polyimide; and materials for the first and second support sub-portions may include metal, for example, molybdenum (Mo) and aluminum (Al).

The arrangement on the same layer refers to production using a primary patterning process. The primary patterning process refers to a process of forming a desired layer structure through one-time film-forming and photoetching. The primary patterning process includes processes such as film forming, exposure, developing, etching and lifting-off.

The infrared absorption portion is disposed on the extension sub-portion and covers the first end of the first electrode and the first end of the second electrode, where the infrared absorption portion may be shaped as a ring, a strip and the like. The infrared absorption portion may be only disposed on the extension sub-portion, or may further extend to a place above the coverage sub-portion, which is not limited here. Preferably, referring to the depiction in FIG. 7, the cavity structure is provided below the extension sub-portion 132; the first sacrifice sub-portion 11 is provided below the coverage sub-portion; the infrared absorption portion is only disposed above the extension sub-portion. In this way, the cavity structure can be used to insulate heat to prevent the heat from being consumed by the first sacrifice sub-portion, thereby increasing the conversion efficiency between the heat and the electromotive potential to improve the measurement accuracy.

It should be noted that in the case that the infrared temperature measurement unit includes a plurality of infrared temperature measurement sub-units, in consideration of space saving, the plurality of infrared temperature measurement sub-units may share the second support sub-portion and the second sacrifice sub-portion. That is, the second ends of the first and second electrodes of different thermocouples may be disposed on the second support sub-portion. Similarly, the plurality of infrared temperature measurement sub-units may also share the first support sub-portion and the first sacrifice sub-portion. That is, the first ends of the first and second electrodes (i.e., the junctions of the first and second electrodes) of different thermocouples may be disposed on the second support sub-portion.

In the infrared temperature measurement unit, the cavity structure is at least included between the adjacent first and second sacrifice sub-portions. It should be noted that in the case that the infrared temperature measurement unit includes only one infrared temperature measurement sub-unit, the cavity structure here may be included between the adjacent first sacrifice sub-portion and the second sacrifice sub-portion. In the case that the infrared temperature measurement unit includes a plurality of infrared temperature measurement sub-units, the cavity structure here may be included between any adjacent first sacrifice sub-portions, between any adjacent second sacrifice sub-portions, and between any adjacent first and second sacrifice sub-portions, respectively. This is not specifically limited here.

Referring to the depiction in FIG. 7, a cavity structure 4 is included between the second sacrifice sub-portion 12 on the left and the first sacrifice sub-portion 11; and the cavity structure 4 is included between the first sacrifice sub-portion 11 and the second sacrifice sub-portion 12 on the right.

An embodiment of the present disclosure provides a sensor, in which a cavity structure is at least disposed between the adjacent first and second sacrifice portions. Compared with a cavity structure produced from a silicon substrate, this can effectively reduce the cost, with simple production process and low technical difficulty. Meanwhile, the cavity structure may be formed by over-etching a sacrifice film. Compared with the method for forming a cavity structure by deep etching a silicon substrate, said over-etching can reduce the time consumption of the process and lower the technical difficulty to further reduce the cost.

In order to increase the detection efficiency and detection precision, in the case that the infrared temperature measurement unit includes a plurality of infrared temperature measurement sub-units, the thermocouples of the plurality of infrared temperature measurement sub-units are connected in series.

Figure 21:
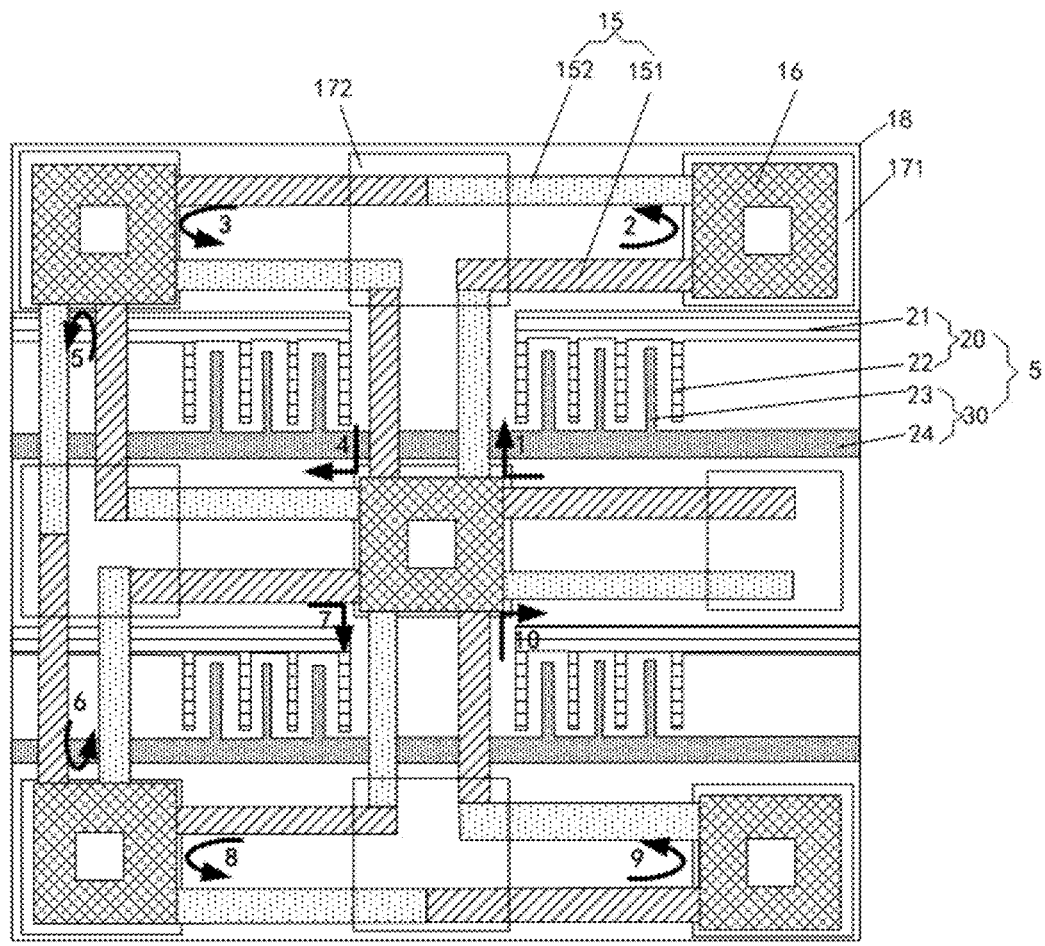
FIG. 21 is a schematic structural diagram of a sensor according to an embodiment of the present disclosure.

Referring to the depiction in FIG. 21, a second electrode 152 of a thermocouple 1 is connected to a first electrode 151 of a thermocouple 2; a second electrode 152 of the thermocouple 2 is connected with a first electrode 151 of the thermocouple 3; and so forth, the infrared temperature measurement unit with ten thermocouples connected in series is obtained as shown in FIG. 21. When the sensor including said infrared temperature measurement unit is applied to infrared temperature measurement, the total electromotive potential of the plurality of thermocouples connected in series may be measured, based on which the temperature of the object to be measured is obtained.

Optionally, the infrared temperature measurement unit includes a plurality of infrared temperature measurement sub-units. In the infrared temperature measurement unit, the cavity structure is included between any adjacent first sacrifice sub-portions, between any adjacent second sacrifice sub-portions, and between any adjacent first and second sacrifice sub-portions, respectively. In this way, more cavity structures may be formed to reduce heat loss, which is conducive to improving the accuracy in infrared temperature measurement.

Optionally, referring to FIGS. 5-7, the infrared temperature measurement sub-unit further includes: a first insulating portion 171 and at least one second insulating portion 172, wherein the first and second insulating portions are arranged on the same layer; the first insulating portion 171 covers the first support sub-portion (the coverage sub-portion 131 and the extension sub-portion 132 are include in FIG. 7) and disposed between the first support sub-portion and the thermocouple; and the second insulating portion 172 covers the second support sub-portion 16 and disposed between the second support sub-portion and the thermocouple.

The number of the second insulating portion is the same as that of the second support sub-portion. For example, if the infrared temperature measurement sub-unit includes one second support sub-portion, the infrared temperature measurement sub-unit here may further include one second insulating portion.

Materials for the first and second insulating portions may include an inorganic material, for example, silicon nitride and silicon oxide.

The first and second insulating portions may play an insulating role to protect the thermocouple from the first and second support sub-portions.

Optionally, materials for the first sacrifice and second sacrifice sub-portions include an organic material; materials for the first and second support sub-portions include metal; and a material for the thermocouple includes metal or a metal alloy.

In a plasma dry-etching process, an etching rate of a plasma gas on an organic material is far greater than that of the plasma gas on metal or metal alloy. Therefore, a dry-etching over-etching process may be used to form the first sacrifice sub-portion, the second sacrifice sub-portion and the cavity structure. This process is simple and easy to realize with short time consumed.

Figure 3:
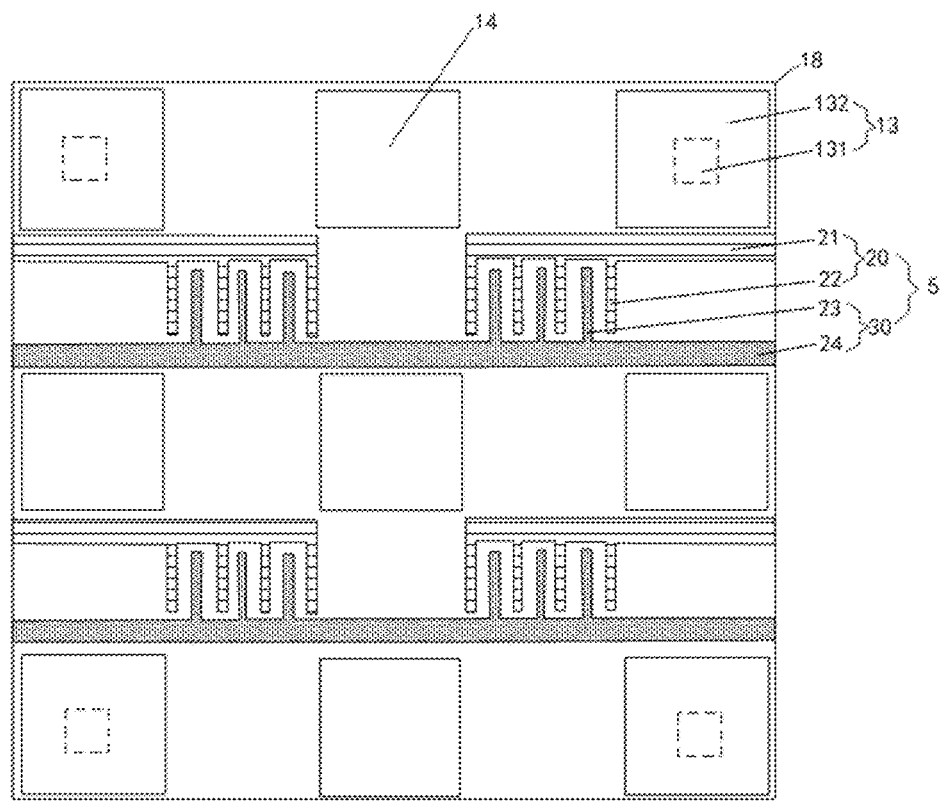

Optionally, the sensor further includes at least one visible-light sensing unit disposed between the substrate and the at least one infrared temperature measurement sub-unit. With reference to FIG. 5 and FIG. 6, the visible-light sensing unit includes: an interdigital electrode 5 and a visible-light absorption portion 17 covering the interdigital electrode 5. It should be noted that in FIGS. 3-5, a visible-light absorption portion is not clearly marked in order to more clearly present the structure of an interdigital electrode.

The interdigital electrode is an electrode with a periodic pattern within a finger-like or comb-like plane. The specific shape of the interdigital electrode is not limited here.

A material for the interdigital electrode may be metal, for example, molybdenum (Mo) and aluminum (Al); and a material for the visible-light absorption portion may be a semiconductor material, for example, amorphous silicon (a-Si) and amorphous selenium (a-Se). If the material for the interdigital electrode is metal and the material for the visible-light absorption portion is the semiconductor material, then a visible-light sensing unit is of a metal-semiconductor-metal (MSM) structure.

When there are a plurality of visible-light sensing units, the visible-light absorption portions of the plurality of visible-light sensing units may be connected or not. If the visible-light absorption portions of the plurality of visible-light sensing units are connected, a layer of visible-light absorption film needs to be deposited only in a production process, and patterning is not needed. If the visible-light absorption portions of the plurality of visible-light sensing units are not connected, a layer of visible-light absorption film needs to be deposited first in a production process, and patterning is then performed to form a plurality of visible-light absorption portions.

The specific number of the visible-light sensing unit is not limited. One infrared temperature measurement sub-unit may be correspondingly provided with one or more visible-light sensing units. FIG. 5 depicts one infrared temperature measurement sub-unit that is correspondingly provided with four visible-light sensing units in an array arrangement, by way of example.

The visible-light sensing units may convert light energy into electric energy to further detect the visible light. Its detection principle is as follows: when the visible-light absorption portion absorbs visible light, a Schottky junction between the interdigital electrode and the visible-light absorption portion is tunneled to form a light current; and the current generated by the interdigital electrode is detected, and the light intensity of the visible light may be calculated based on this current.

The sensor integrates the visible-light sensing unit and the infrared temperature measurement unit, which may simultaneously fulfill the functions of visible-light detection and infrared temperature measurement, thereby enlarging the applicable range of the sensor and greatly increasing the user experience.

In order to prevent the infrared temperature measurement unit from blocking the visible-light absorption portion and to increase the detection accuracy and precision of the visible-light sensing unit, an orthographic projection of the visible-light sensing unit on the substrate is at least partially within an orthographic projection of the cavity structure of the infrared temperature measurement sub-unit on the substrate. That is, the visible-light sensing unit is disposed below the cavity structure, and is visible when seen from a side of the substrate provided with the infrared temperature measurement unit. Preferably, the orthographic projection of the visible-light sensing unit on the substrate is disposed within the orthographic projection of the cavity structure on the substrate.

To simplify the structure and reduce the design difficulty, referring to the depiction in FIG. 5, the interdigital electrode 5 includes a first comb electrode 20 and a second comb electrode 30; the first comb electrode 20 includes: a plurality of first comb-teeth electrodes 22 arranged in parallel and a first comb-shank electrode 21 connecting the plurality of first comb-teeth electrodes 22; the second comb electrode 30 includes: a plurality of second comb-teeth electrodes 23 arranged in parallel and a second comb-shank electrode 24 connecting the plurality of second comb-teeth electrodes 23; and the plurality of first comb-teeth electrodes 22 and the plurality of second comb-teeth electrodes 23 are mutually crossed in arrangement.

Here, the first comb-teeth electrode and the second comb-teeth electrode are not limited in specific number, and meanwhile, an angle between the first comb-teeth electrode and the first comb-shank electrode and an angle between the second comb-teeth electrode and the second comb-shank electrode are not limited. FIG. 5 depicts, by way of example, that the first comb electrode 20 includes three first comb-teeth electrodes 22, the second comb electrode 30 includes three second comb-teeth electrodes 23, the angle between the first comb-teeth electrode 22 and the first comb-shank electrode 21 is 90°, and the angle between the second comb-teeth electrode 23 and the second comb-shank electrode 24 is 90°.

Optionally, where there are a plurality of infrared temperature measurement units, the plurality of infrared temperature measurement units are arranged in an array to facilitate the design. When the sensor includes a plurality of infrared temperature measurement units, the temperature of a plurality of objects to be measured may be measured at the same time; or the temperature of a plurality of regions of the same object to be measured may be measured at the same time; or the plurality of infrared temperature measurement units may be used to output corresponding relations between the position of each portion of the object to be measured and the temperature, thereby greatly enlarging the detection range.

Optionally, a material for the substrate includes glass or polyimide. Compared with the silicon substrate, the cost is greatly reduced by using a glass substrate and a polyimide substrate. If a material of the substrate includes polyimide, the sensor may be a flexible device and has a bendable property since the polyimide is a flexible material.

This embodiment of the present disclosure provides a test device including the sensor according to the above embodiment. The test device may be used in contactless infrared temperature detection, and also in visible-light detection, and has the characteristics of simple structure and low production cost.

This embodiment of the present disclosure provides a method for producing the sensor defined in the above embodiment. The method includes the following steps.

In S01, a substrate is provided

The material for the substrate may be a non-silicon rigid material, for example, glass, where the sensor here may be a rigid device without a bendable property. Or the material for the substrate may also be a non-silicon flexible material, for example, polyimide (Pl), where the sensor here may be a flexible device with a bendable property.

In S02, at least one infrared temperature measurement sub-unit is formed on the substrate.

Here, in S02, forming the at least one infrared temperature measurement sub-unit on the substrate includes:

S10, forming at least one first support portion, at least one second support portion, at least one thermocouple, and at least one infrared absorption portion on the substrate.

Here, the thermocouple includes a first electrode and a second electrode, each of which includes a first end and a second end; the first end of the first electrode and the first end of the second electrode are connected and disposed on the first support portion; the infrared absorption portion is disposed on the first support portion and covers the first end of the first electrode and the first end of the second electrode; the second end of the first electrode and the second end of the second electrode are not connected and disposed on the second support portion; and a cavity structure is at least included between the adjacent first and second support portions.

Further optionally, the first support portion includes a first sacrifice sub-portion and a first support sub-portion; the second support portion includes a second sacrifice sub-portion and a second support sub-portion. Then, in S10, forming the at least one first support portion, at least one second support portion, at least one thermocouple, and at least one infrared absorption portion on the substrate includes the following steps.

In S021, a sacrifice film is formed on a substrate, where a material for the sacrifice film includes an organic material.

Specifically, the sacrifice film is formed on the substrate by a spinning method, and the material for the sacrifice film is polyimide. It should be noted that the sacrifice film after being formed by the spinning method needs to be baked at certain temperature to fully remove moisture to avoid affecting subsequent processes.

In S022, a support film is formed on the sacrifice film and patterned to obtain at least one first support sub-portion and at least one second support sub-portion, where a material for the support film includes metal, and the first support sub-portion includes a coverage sub-portion and an extension sub-portion surrounding the coverage sub-portion.

Specifically, a sputtering process may be used to deposit and pattern a layer of support film on the sacrifice film, where the material for the support film may be metal, for example, molybdenum (Mo) and aluminum (Al).

In S023, at least one thermocouple is formed, where first electrodes of first and second electrodes (i.e., a junction of the first and second electrodes) of thermocouple are disposed above the extension sub-portion, and second ends of the first and second electrodes are disposed on the second support sub-portion.

Specifically, in S023, forming the at least one thermocouple includes the following steps.

In S0231, a first electrode film is formed and patterned to obtain at least one first electrode.

In S0232, a second electrode film is formed and patterned to obtain at least one second electrode connected with the at least one first electrode respectively, where materials for the first and second electrodes are different metal.

In S024, an infrared absorption film is formed and patterned to obtain at least one infrared absorption portion, which is disposed above the extension sub-portion and covers the junction.

Specifically, a lift-off process may be used to form and pattern the infrared absorption film.

In S025, the sacrifice film is over-etched by a dry etching process to obtain at least one first sacrifice sub-portion, at least one second sacrifice sub-portion and at least one cavity structure, where the coverage sub-portion covers the first sacrifice sub-portion, and the second support sub-portion covers the second sacrifice sub-portion; and the cavity structure is included between any adjacent first sacrifice sub-portions, any adjacent second sacrifice sub-portions, and any adjacent first and second sacrifice sub-portions.

Figure 22:
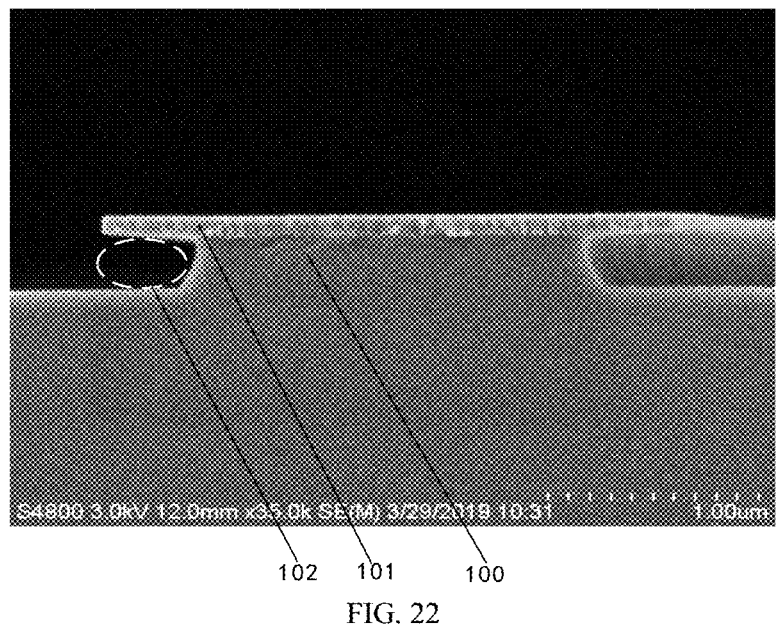
FIG. 22 is a scanning electron microscope graph of a dry-etching over-etched structure according to an embodiment of the present disclosure.

It should be noted that in the dry etching process, an etching rate of a plasma gas on an organic material is far greater than that of the plasma gas on metal or metal alloy. Therefore, a dry-etching over-etching process may be used to form the first sacrifice sub-portion, the second sacrifice sub-portion and the cavity structure. FIG. 22 is a scanning electron microscope graph of a structure formed based on the principle of this dry-etching over-etching. In FIG. 22, an upper layer is a metal layer 101, a lower layer is an inorganic layer 100, and since the etching rate of the plasma gas on the inorganic layer is greater than that of the plasma gas on the metal, a cavity structure 102 is etched below an end of the metal layer 101 after the organic layer is dry-etched and over-etched.

An embodiment of the present disclosure provides a method for producing a sensor, where a cavity structure is formed by performing dry-etching over-etching on a sacrifice film. Compared with the method for forming the cavity structure by deep-etching a silicon substrate, the time consumption of the process can be reduced and the technical difficulty can be reduced, thereby further reducing the cost.

Optionally, the sensor further includes at least one visible-light sensing unit.

After providing the substrate in S01 and before forming the at least one infrared temperature measurement unit on the substrate in S02, the method further includes:

S03, forming at least one visible-light sensing unit on the substrate.

Optionally, in S03, forming the at least one visible-light sensing unit on the substrate includes the following steps.

Figure 2:
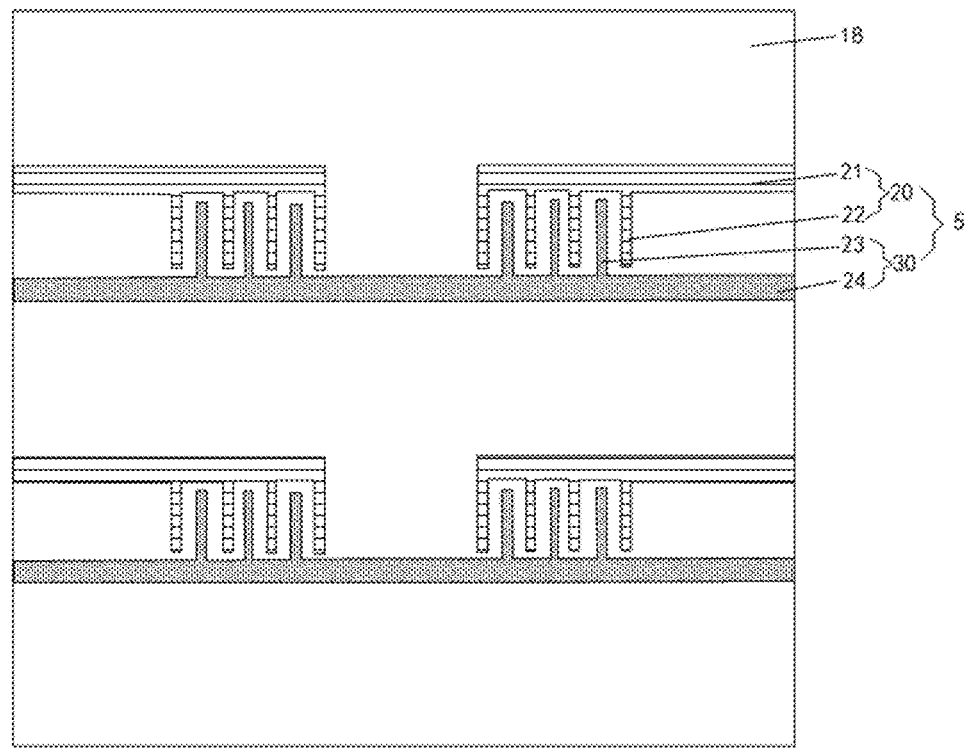
FIGS. 2-5 are schematic structural diagrams of a process for producing a sensor according to the embodiments of the present disclosure.

In S031, an electrode film is formed and patterned to obtain a plurality of interdigital electrodes 5 shown in FIG. 2.

Specifically, a sputtering process may be used to form and pattern a layer of electrode film on the substrate, where a material for the electrode film may be metal, such as molybdenum (Mo) and aluminum (Al).

In S032, a visible-light absorption film is formed, where the visible-light absorption film covers a plurality of interdigital electrodes.

Specifically, a chemical vapor deposition (CVD) method may be used to deposit the visible-light absorption film on the interdigital electrode; and a material for the visible-light absorption film may be an inorganic semiconductor material, for example, amorphous silicon (a-Si) and amorphous selenium (a-Se).

It should be noted that in S032, when there are a plurality of visible-light sensing units, a plurality of visible-light absorption portions of the formed visible-light sensing units are connected. After S032, the visible-light absorption film is patterned to form a plurality of independent visible-light absorption portions.

A production method is explained in detail below by preparing the structure shown in FIG. 5 on a flexible substrate, by way of example. The method may include the following steps.

Figure 8:
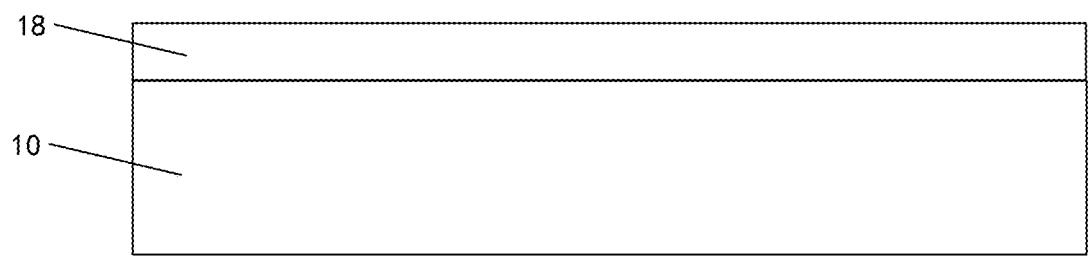
FIGS. 8-20 are schematic structural diagrams of another process for producing a sensor according to the embodiments of the present disclosure.

In S101, referring to the depiction in FIG. 8, a polyimide layer 18 is produced on a glass substrate 10 by using the spinning method.

Figure 9:
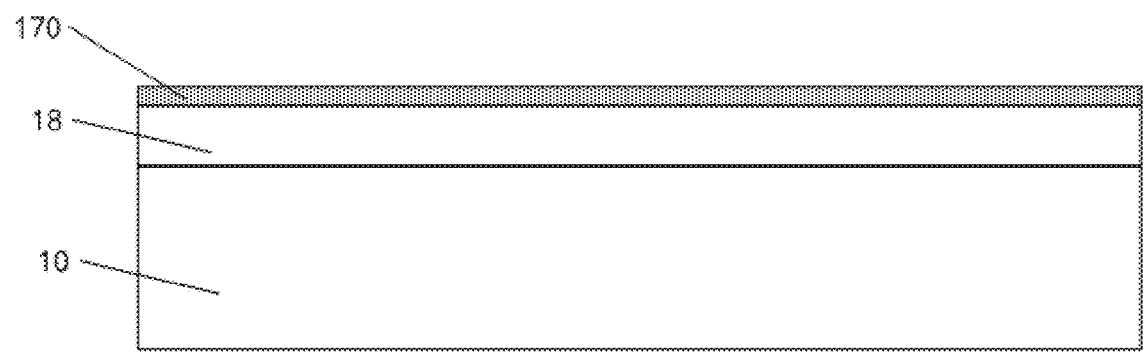
Figure 10:
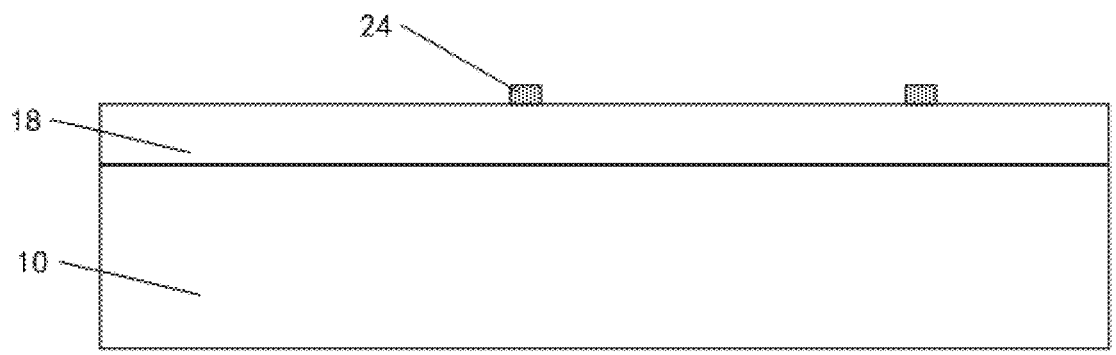

In S102, referring to the depictions in FIGS. 9 and 10, a layer of metal film 170 is deposited on the polyimide layer 18 by using a puttering process and then patterned to obtain a plurality of interdigital electrodes.

Figure 11:
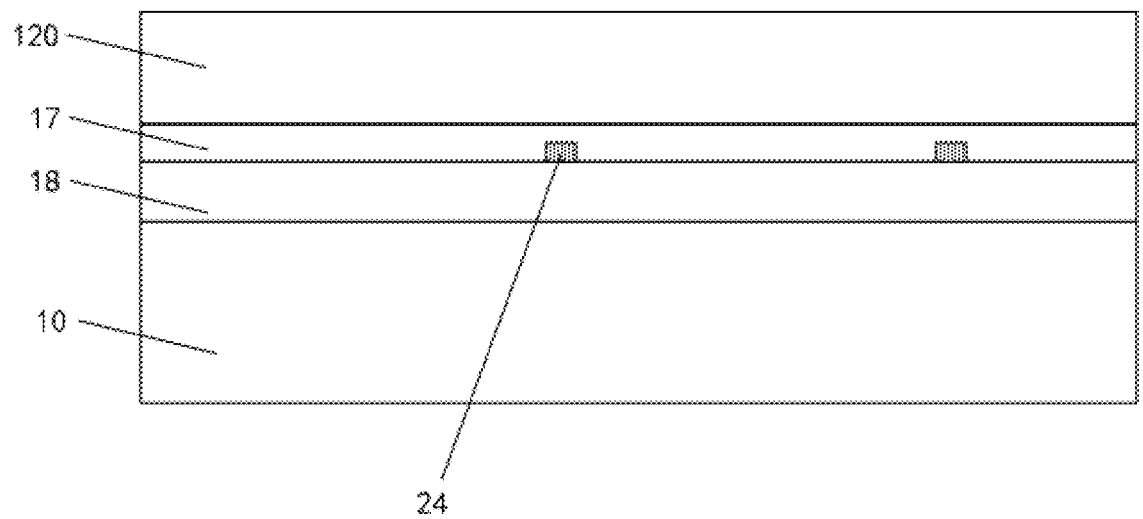

In S103, referring to the depiction in FIG. 11, a layer of visible-light absorption film 17 is deposited on the interdigital electrode by using the CVD method, where a material for the visible-light absorption film is an inorganic semiconductor material, for example, amorphous silicon (a-Si) and amorphous selenium (a-Se).

In S104, referring to the depiction in FIG. 11, a layer of sacrifice film 120 is formed by the spinning method, where a material for the sacrifice film is polyimide and covers the visible-light absorption film.

Figure 12:
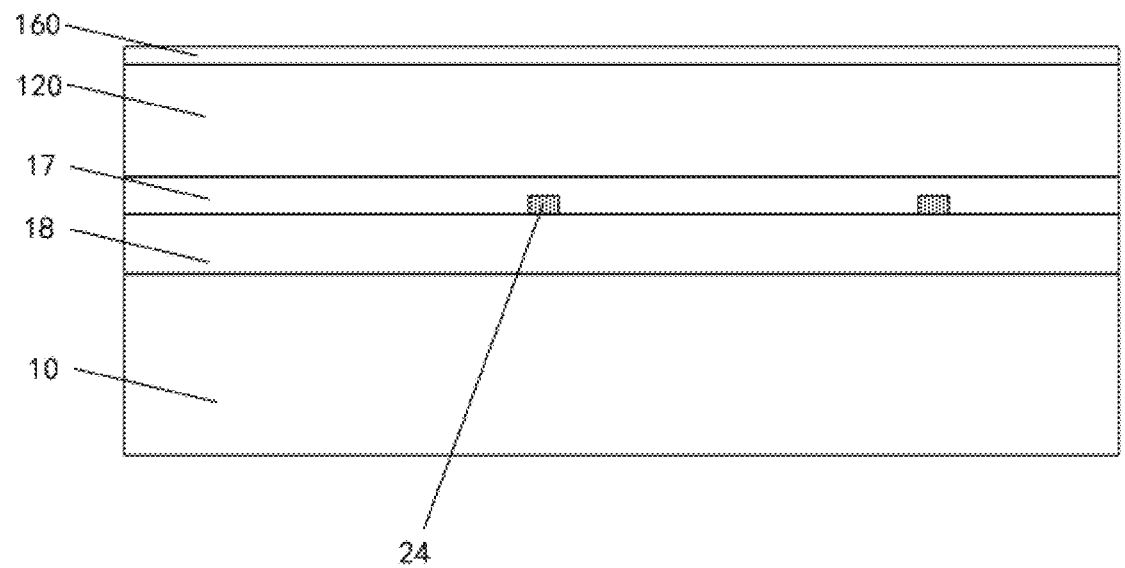
Figure 13:
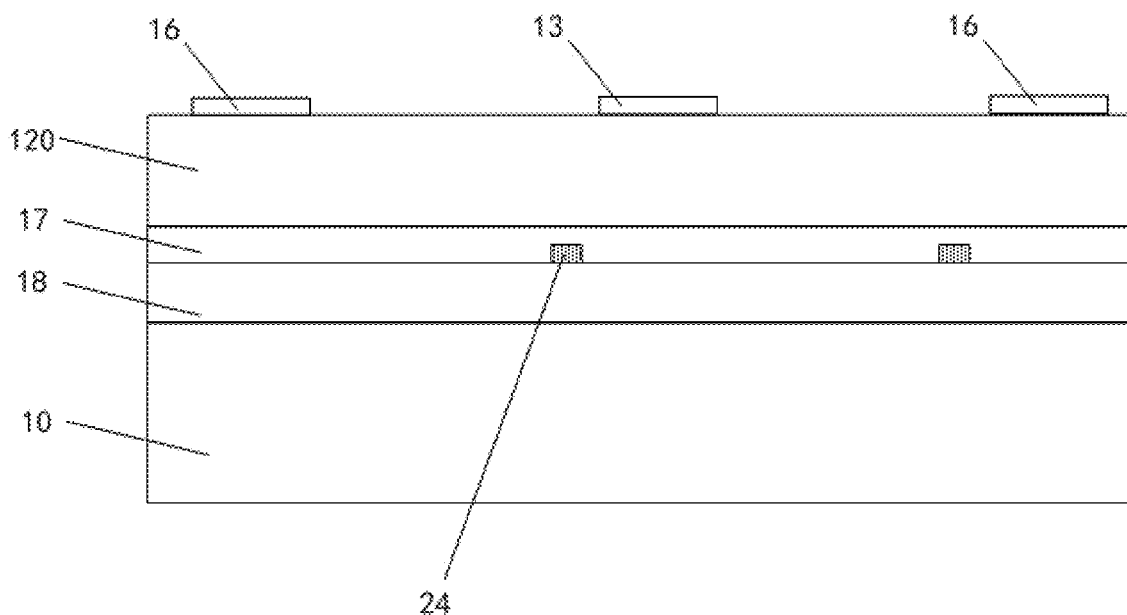

In S105, referring to the depictions in FIGS. 12 and 13, a layer of support film 160 is deposited on the sacrifice film 120 and patterned by the sputtering process to obtain a plurality of first support sub-portions 13 and a plurality of second support sub-portions 16, where a material for the support film may be metal, such as molybdenum (Mo) and aluminum (Al). The first support sub-portion includes a coverage sub-portion and an extension sub-portion surrounding the coverage sub-portion.

Figure 14:
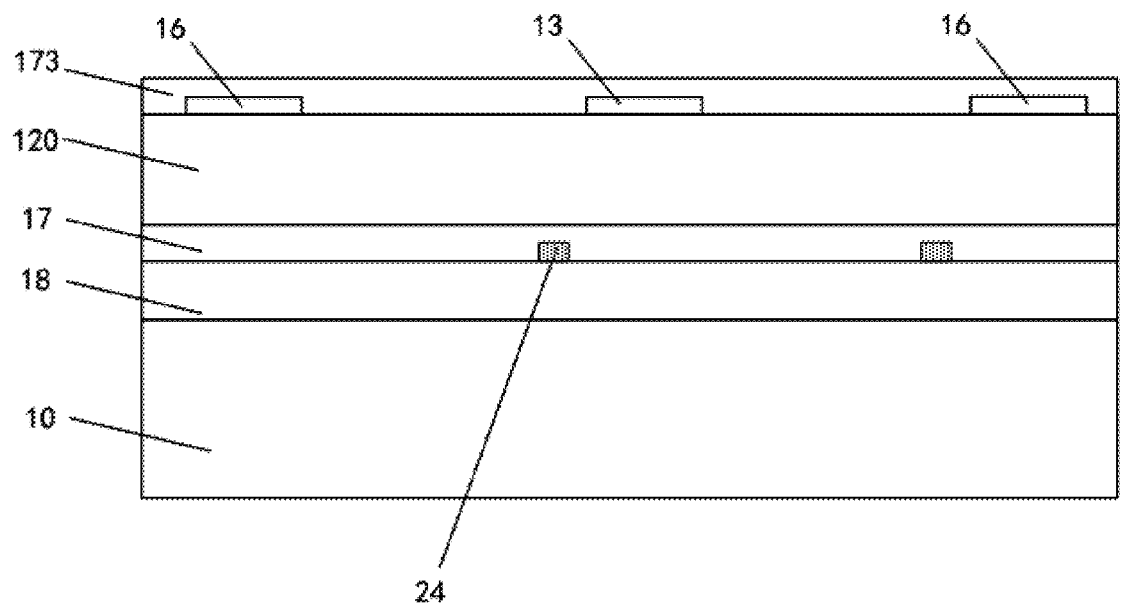

In S106, referring to the depiction in FIG. 14, a layer of inorganic insulating film 173 is deposited by CVD.

Figure 15:
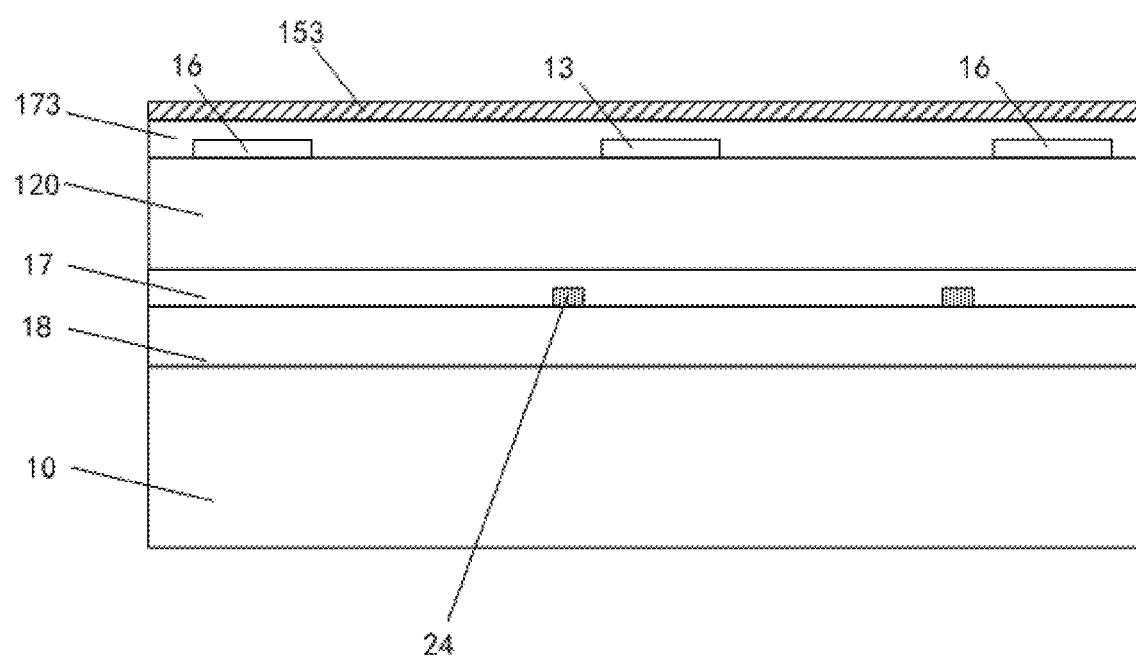
Figure 16:
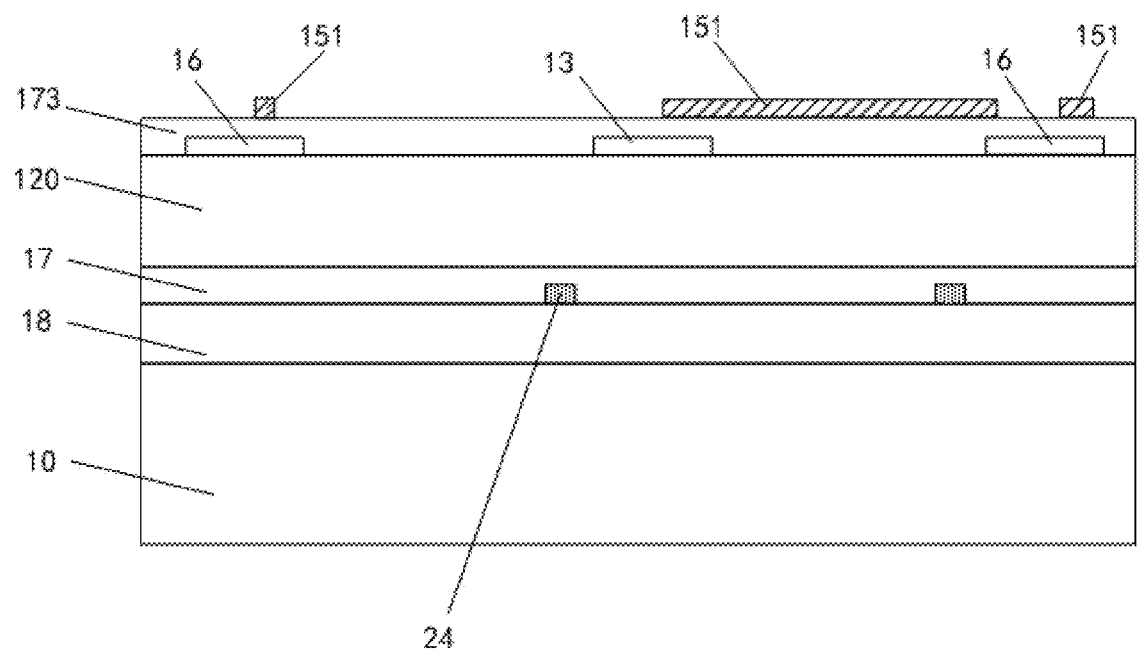

In S107, referring to the depictions in FIGS. 15 and 16, a layer of first electrode film 153 is deposited on the inorganic insulating film 173 by the sputtering process and then patterned to obtain a plurality of first electrodes 151.

Figure 17:
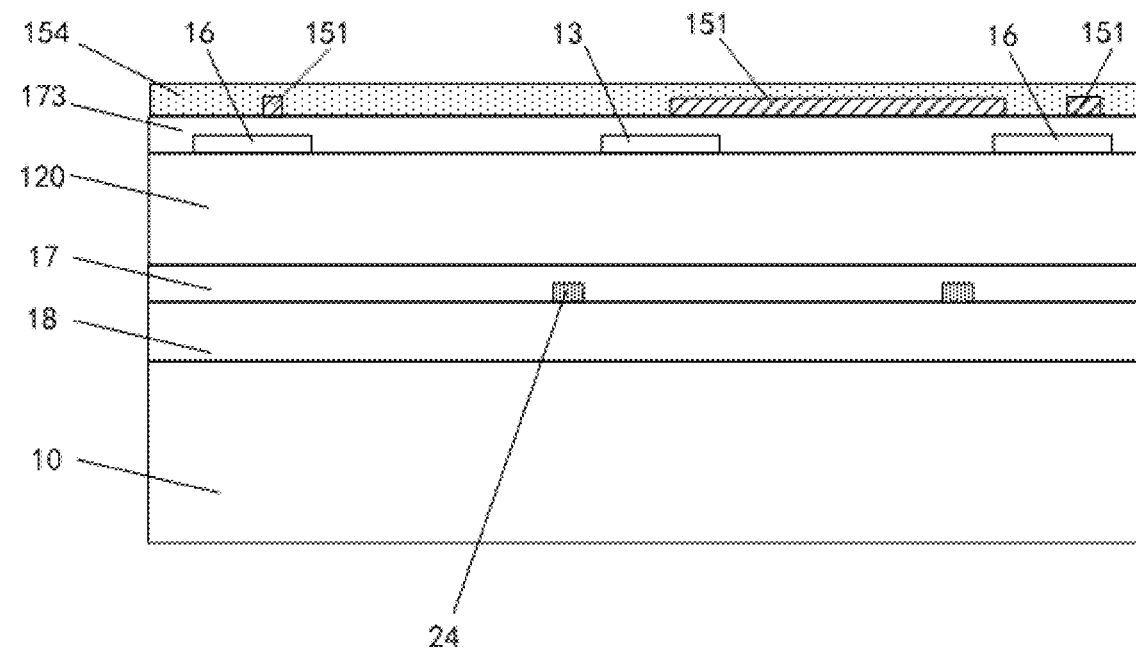
Figure 18:
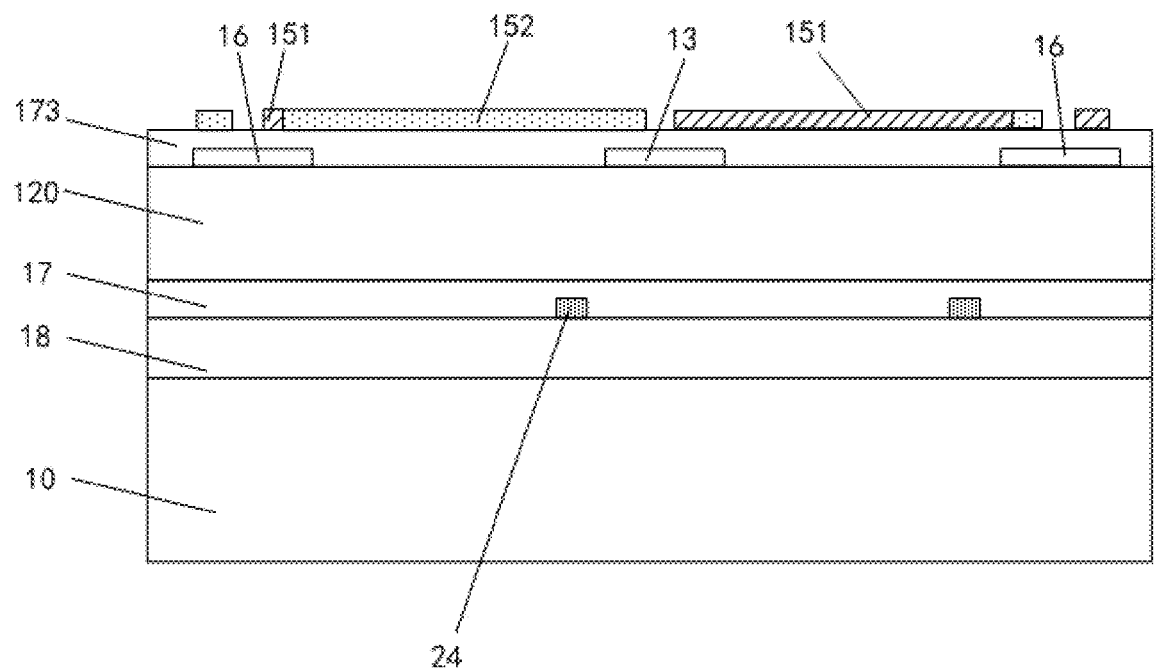

In S108, referring to the depictions in FIGS. 17 and 18, a layer of second electrode film 154 is deposited on the plurality of first electrodes 151 by the sputtering process and then patterned to obtain a plurality of second electrodes 152. The junctions of the first and second electrodes are disposed on the extension sub-portion, and the first electrodes are not connected to the second ends of the second electrodes and disposed on the second support sub-portion.

Figure 19:
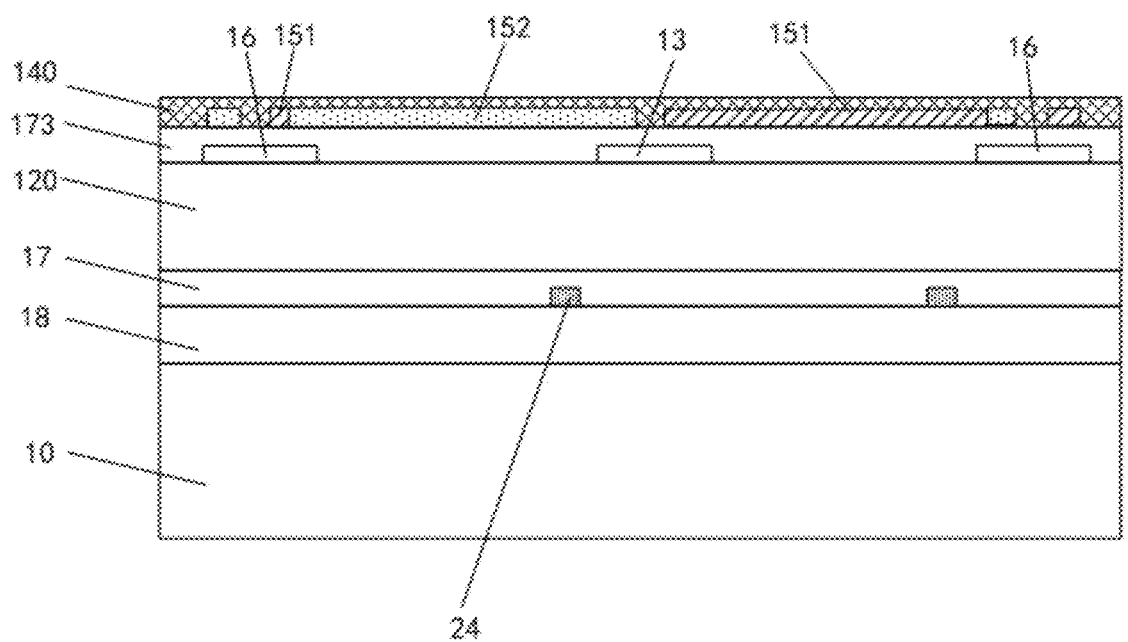
Figure 20:
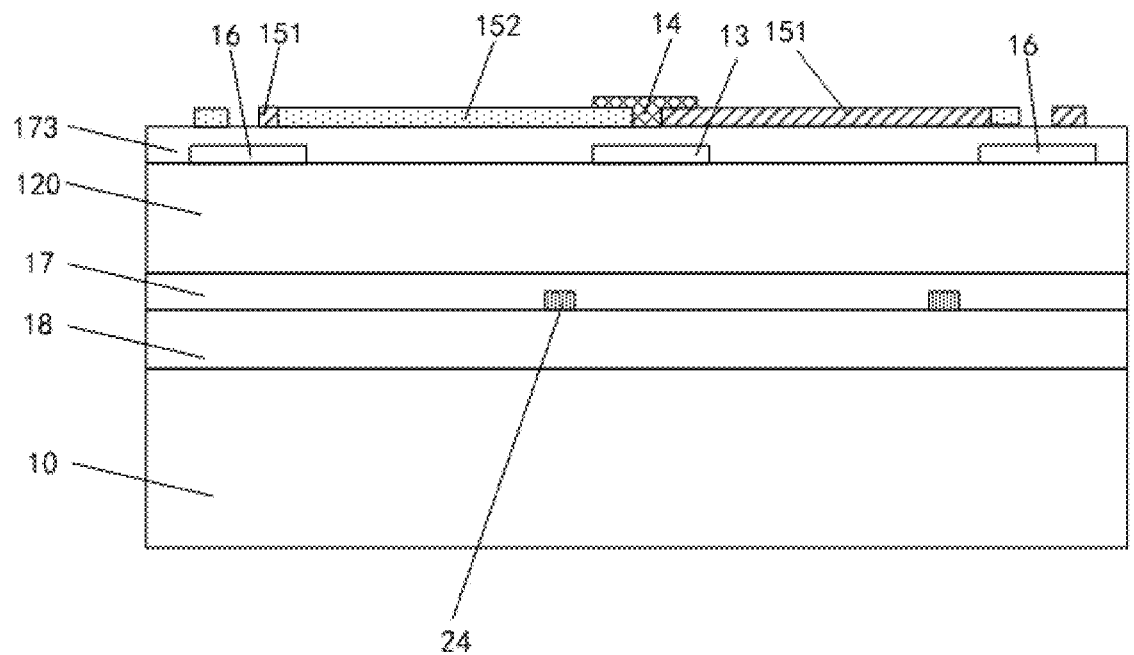

In S109, referring to the depictions in FIGS. 19 and 20, an infrared absorption film 140 is formed and patterned by the lift-off process to obtain a plurality of infrared absorption portions 14, which are disposed on the extension sub-portions and cover the junctions.

In S110, the sacrifice film and the inorganic insulating film are over-etched by the dry etching process to obtain a plurality of sacrifice sub-portions 11, a plurality of second sacrifice sub-portions 12, a plurality of cavity structures 4, a plurality of first insulating portions 171, and a plurality of second insulating portions 172 as shown in FIGS. 6 and 7.

In S111, the glass substrate is removed to obtain a flexible sensor.

It should be noted that in the embodiment of the present disclosure, a reference may be made to the above embodiment for the description related to related structures in the sensor, which will not be repeated here anymore. It should be understood that when the glass-based sensor is prepared, Steps S101 and S111 may be omitted; and in Step S102, a layer of metal film 170 is deposited on the glass substrate 10 and patterned by the sputtering process to obtain a plurality of interdigital electrodes.

This embodiment of the present disclosure provides a test method of the sensor. The method includes the following steps.

In S10, the sensor is disposed nearby an object to be tested, such that the sensor can receive infrared light emitted by the object to be tested.

In S11, an electromotive potential output by a thermocouple in the sensor is detected.

In S12, the temperature of the object to be tested is calculated based on the electromotive potential.

In some embodiments, the number of the thermocouple is one; in other embodiments, the thermocouples are a plurality of thermocouples connected in series, and in the step of calculating temperature of the object to be tested according to the electromotive potential, the electromotive potential is the total electromotive potential of the plurality of thermocouples connected in series.

It should be noted that the sensor may further include a first processing unit, which may be configured to execute S12, and may be a single chip microcomputer, an advanced RISC machine (ARM), or a field programmable gate array (FPGA) and other chips, which can be determined specifically according to actual design needs.

With the test method defined above, a contactless infrared temperature measurement method can be accomplished. This test method is simple and easy to realize, and shows high safety due to no direct contact with an object to be detected.

Optionally, the method further includes the following steps.

In S20, the sensor is disposed in an environment to be tested, such that the sensor can receive visible light in the environment to be tested;

In S21, a current output by an interdigital electrode in the sensor is detected.

In S22, light intensity of the visible light in the environment to be tested is calculated based on the current.

It should be noted that the sensor may further include a second processing unit, which may be configured to execute S22, and may be a single chip microcomputer, an advanced RISC machine (ARM), or a field programmable gate array (FPGA) and other chips, which can be determined specifically according to actual design needs.

Here, the second processing unit and the first processing unit may be integrated together or arranged separately. The former is generally preferred in consideration of cost reduction.

With the test method defined above, visible-light detection can be implemented. This method is simple and easy to implement.

The embodiments of the present invention provide a sensor, a method for producing the same, and a test method and device thereof. The sensor includes: a substrate and at least one infrared temperature measurement unit disposed on the substrate. The infrared temperature measurement unit includes at least one infrared temperature measurement sub-unit. The infrared temperature measurement sub-unit includes: a first support portion, at least one second support portion, a thermocouple, and an infrared absorption portion, wherein the thermocouple includes a first electrode and a second electrode, each of which includes a first end and a second end; the first end of the first electrode and the first end of the second electrode are connected and disposed on the first support portion; the infrared absorption portion is disposed on the first support portion and covers the first end of the first electrode and the first end of the second electrode; the second end of the first electrode and the second end of the second electrode are not connected and disposed on the second support portion; and in the infrared temperature measurement unit, a cavity structure is at least included between the adjacent first and second support portions.

The above description only provides the specific embodiments of the present disclosure, but the protection scope of the present disclosure is not limited thereto. Any variations or substitutions easily conceivable by a person skilled in the art within the technical scope of the present disclosure should be included within the protection scope of the present disclosure. Therefore, the protection scope of the present disclosure should be subject to the protection scope of the claims.

The invention claimed is:

1. A sensor, comprising: a substrate and at least one infrared temperature measurement unit disposed on the substrate, wherein the infrared temperature measurement unit comprises at least one infrared temperature measurement sub-unit;

the infrared temperature measurement sub-unit comprises: a first support portion, at least one second support portion, a thermocouple, and an infrared absorption portion, wherein the thermocouple comprises a first electrode and a second electrode, each of which comprises a first end and a second end; the first end of the first electrode and the first end of the second electrode are connected and disposed on the first support portion; the infrared absorption portion is disposed on the first support portion and covers the first end of the first electrode and the first end of the second electrode; the second end of the first electrode and the second end of the second electrode are not connected and disposed on the second support portion; and in the infrared temperature measurement unit, a cavity structure is comprised between at least the adjacent first support portion and the second support portion;

wherein in the infrared temperature measurement sub-unit, the first support portion comprises a first sacrifice sub-portion and a first support sub-portion, and the second support portion comprises a second sacrifice sub-portion and a second support sub-portion; the first sacrifice sub-portion and the second sacrifice sub-portion are arranged on the same layer, and the first support sub-portion and the second support sub-portion are arranged on the same layer;

wherein the first support sub-portion comprises a coverage sub-portion and an extension sub-portion surrounding the coverage sub-portion, and the coverage sub-portion covers the first sacrifice sub-portion; the first ends of the first electrode and the second electrode of the thermocouple are both disposed on the extension sub-portion; the infrared absorption portion is deposed on the extension sub-portion and covers the first end of the first electrode and the first end of the second electrode; the second ends of the first electrode and the second electrode are disposed on the second support sub-portion; the second support sub-portion covers the second sacrifice sub-portion; and in the infrared temperature measurement unit, a cavity structure is comprised between at least the adjacent first sacrifice sub-portion and the second sacrifice sub-portion.

2. The sensor according to claim 1, wherein the infrared temperature measurement unit comprises a plurality of the infrared temperature measurement sub-units; and in the infrared temperature measurement unit, the cavity structures are comprised between any adjacent first sacrifice sub-portions, between any adjacent second sacrifice sub-portions, and between any the adjacent first sacrifice sub-portion and the second sacrifice sub-portion.

3. The sensor according to claim 1, wherein the infrared temperature measurement sub-unit further comprises: a first insulating portion and at least one second insulating portion; the first insulating portion and the second insulating portion are arranged on the same layer; the first insulating portion covers the first support sub-portion and disposed between the first support sub-portion and the thermocouple; and the second insulating portion covers the second support sub-portion and disposed between the second support sub-portion and the thermocouple.

4. The sensor according to claim 1, wherein materials for the first sacrifice sub-portion and the second sacrifice sub-portion comprise an organic material; materials for the first support sub-portion and the second support sub-portion comprise metal; and a material for the thermocouple comprises metal.

5. The sensor according to claim 2, wherein the thermocouples of the plurality of infrared temperature measurement sub-units comprised by the infrared temperature measurement unit are connected in series.

6. The sensor according to claim 3, wherein the number of the second insulating portion is the same as the number of the second support sub-portion.

7. The sensor according to claim 1, further comprising at least one visible-light sensing unit disposed between the substrate and the at least one infrared temperature measurement sub-unit, wherein the visible-light sensing unit comprises: an interdigital electrode and a visible-light absorption portion covering the interdigital electrode.

8. The sensor according to claim 7, wherein an orthographic projection of the visible-light sensing unit on the substrate is at least partly disposed within an orthographic projection of the cavity structure of the infrared temperature measurement sub-unit on the substrate.

9. The sensor according to claim 7, wherein the interdigital electrode comprises a first comb electrode and a second comb electrode; the first comb electrode comprises: a plurality of first comb-teeth electrodes arranged in parallel and a first comb-shank electrode connecting the plurality of first comb-teeth electrodes; the second comb electrode comprises s: a plurality of second comb-teeth electrodes arranged in parallel and a second comb-shank electrode connecting the plurality of second comb-teeth electrodes; and the plurality of first comb-teeth electrodes and the plurality of second comb-teeth electrodes are mutually crossed in arrangement.

10. The sensor according to claim 1, wherein the plurality of infrared temperature measurement units is arranged in an array.

11. The sensor according to claim 1, wherein a material for the substrate comprises glass or polyimide.

12. A test device, comprising the sensor according to claim 1.

13. A method for producing the sensor according to claim 1, comprising:

providing the substrate; and forming at least one infrared temperature measurement sub-unit on the substrate;

wherein forming the at least one infrared temperature measurement sub-unit on the substrate comprises:

forming at least one first support portion, at least one second support portion, at least one thermocouple, and at least one infrared absorption portion on the substrate.

14. The method according to claim 13, comprising: forming a sacrifice film on the substrate by the spinning method, wherein a material for the sacrifice film is polyimide.

15. The method according to claim 14, wherein the method further comprises:

forming a cavity structure by performing dry-etching over-etching on the sacrifice film.

16. The method according to claim 13, wherein the sensor further comprises at least one visible-light sensing unit; and after providing the substrate and before forming the at least one infrared temperature measurement unit on the substrate, the method further comprises:

forming at least one visible-light sensing unit on the substrate.

17. A test method of the sensor according to claim 1, comprising:

disposing the sensor nearby an object to be tested, so that the sensor is capable to receive infrared light emitted by the object to be tested;

detecting an electromotive potential output by a thermocouple in the sensor; and calculating temperature of the object to be tested according to the electromotive potential.

18. The method according to claim 17, wherein the thermocouples are a plurality of thermocouples connected in series, and in the step of calculating temperature of the object to be tested according to the electromotive potential, the electromotive potential is the total electromotive potential of the plurality of thermocouples connected in series.

19. The method according to claim 17, wherein the sensor further comprises at least one visible-light sensing unit, the method further comprises:

disposing the sensor in an environment to be tested, so that the sensor is capable to receive visible light in the environment to be tested;

detecting a current output by an interdigital electrode in the sensor; and calculating light intensity of the visible light in the environment to be tested based on the current.

* * * * *